United States Patent
Kim et al.

(10) Patent No.: US 9,525,580 B2
(45) Date of Patent: Dec. 20, 2016

(54) MONITORING CONTROL CHANNEL IN WIRELESS COMMUNICATION SYSTEM

(75) Inventors: So Yeon Kim, Anyang-si (KR); Jae Hoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 698 days.

(21) Appl. No.: 12/933,378

(22) PCT Filed: Mar. 19, 2009

(86) PCT No.: PCT/KR2009/001418
§ 371 (c)(1),
(2), (4) Date: Sep. 17, 2010

(87) PCT Pub. No.: WO2009/116824
PCT Pub. Date: Sep. 24, 2009

(65) Prior Publication Data
US 2011/0021228 A1    Jan. 27, 2011

Related U.S. Application Data

(60) Provisional application No. 61/038,056, filed on Mar. 20, 2008, provisional application No. 61/038,415, (Continued)

(30) Foreign Application Priority Data

Aug. 26, 2008   (KR) .......................... 10-2008-0083131

(51) Int. Cl.
*H04L 27/26*       (2006.01)
*H04L 5/00*        (2006.01)

(52) U.S. Cl.
CPC ......... *H04L 27/2656* (2013.01); *H04L 5/0091* (2013.01); *H04L 27/261* (2013.01)

(58) Field of Classification Search
CPC ... H04L 27/2656; H04L 27/261; H04L 5/0091
(Continued)

(56) References Cited

U.S. PATENT DOCUMENTS 7,920,516 B2    4/2011  Nishio et al.
8,401,542 B2 *  3/2013  Chung et al. ................. 455/423
(Continued)

FOREIGN PATENT DOCUMENTS

JP    2009-218813 A    9/2009
KR   10-2006-0077854 A   7/2006
(Continued)

OTHER PUBLICATIONS

"PDCCH blind decoding—Outcome of offline discussions", Ericsson Feb. 11, 2008.*

(Continued)

*Primary Examiner* — Raymond Dean
(74) *Attorney, Agent, or Firm* — Birch, Stewart, Kolasch & Birch, LLP

(57) ABSTRACT

A method and apparatus of monitoring a physical downlink control channel (PDCCH) is disclosed. A starting location of a search space in a control region of a subframe k is acquired. The search space is defined by a set of PDCCHs at each aggregation level. The set of PDCCHs from the starting location in the search space at the each aggregation level is monitored. The starting location is defined by the multiple of the aggregation level in the control region.

8 Claims, 11 Drawing Sheets

Related U.S. Application Data filed on Mar. 21, 2008, provisional application No. 61/039,112, filed on Mar. 25, 2008.

(58) Field of Classification Search
USPC ............... 455/450–452.2, 509; 370/329
See application file for complete search history.

(56) References Cited

U.S. PATENT DOCUMENTS

| | | | |
|---|---|---|---|
| 2003/0016702 | A1 | 1/2003 | Bender et al. |
| 2006/0067263 | A1* | 3/2006 | Li .................. H04B 7/0802 370/315 |
| 2009/0116575 | A1* | 5/2009 | Hochwald et al. ......... 375/267 |
| 2009/0154607 | A1 | 6/2009 | Lindoff et al. |
| 2009/0168922 | A1 | 7/2009 | Malladi et al. |
| 2009/0197630 | A1* | 8/2009 | Ahn .................. H04L 1/0029 455/522 |

FOREIGN PATENT DOCUMENTS

| | | |
|---|---|---|
| KR | 10-2009-0029620 A | 3/2009 |
| KR | 10-2009-0033001 A | 4/2009 |
| WO | WO 2009/041779 A1 | 4/2009 |
| WO | WO 2009/041785 A2 | 4/2009 |
| WO | WO 2009/057283 A1 | 5/2009 |
| WO | WO 2009/104848 A1 | 8/2009 |

OTHER PUBLICATIONS

Ericsson, "PDCCH blind decoding—Outcome of offline discussions," Feb. 11, 2008, R1-081104, XP002542364.

Mitsubishi Electric, "Blind detection complexity reduction with UE specific PDCCH scrambling," 3GPP TSG RAN WG1, #51bis meeting, Spain, Jan. 14-18, 2008, R1-080405, XP050108924.

Qualcomm Europe, "PDCCH Blind Decodes," 3GPP TSG RAN1 #52, Italy, Feb. 6, 2008, R1-080646, XP050109147.

Samsung, "Configuration of PDCCH Monitoring Set," 3GPP TSG RAN WG1 Meeting #51bis, Spain, Jan. 14-18, 2008, R1-080028, XP050108571.

"3GPP TS 36.213 V8.2.0 Standard Draft" 3rd Generation Partnership Project, E-UTRA, Release 8, Mar. 5, 2008.

* cited by examiner

MONITORING CONTROL CHANNEL IN WIRELESS COMMUNICATION SYSTEM

This application is a National Phase of PCT/KR2009/001418 filed on Mar. 19, 2009, which claims priority under 35 U.S.C. 119(e) to U.S. Provisional Application No. 61/038,056 filed on Mar. 20, 2008, 61/038,415 filed on Mar. 21, 2008, 61/039,112 filed Mar. 25, 2008 and under 35 U.S.C. 119(a) to Patent Application No. 10-2008-0083131 filed in Republic of Korea on Aug. 26, 2008, all of which are hereby expressly incorporated by reference into the present application.

TECHNICAL FIELD

The present invention relates to wireless communications, and more particularly, to a method and apparatus of monitoring a control channel to effectively detect control information.

BACKGROUND ART

In a typical wireless communication system, a base station (BS) provides services to a plurality of user equipments (UEs). The BS schedules user data on the plurality of UEs, and transmits control information together with the user data. The control information contains scheduling information regarding the user data. A channel for carrying the control information is generally referred to as a control channel. A channel for carrying the user data is generally referred to as a data channel. The UE monitors the control channel to find control information of the UE, and processes data of the UE by using the control information. Monitoring is an operation in which the UE attempts to decode control channel candidates.

In order for the UE to receive the user data allocated to the UE, the control information regarding the user data on the control channel must be received. In general, a plurality of pieces of control information of the plurality of UEs are multiplexed within one transmission interval in a given bandwidth. That is, to provide a service to the plurality of UEs, the BS multiplexes the plurality of pieces of control information of the plurality of UEs and transmits the control information through a plurality of control channels. Each UE finds its own control channel from the plurality of control channels.

Blind decoding is one of schemes for detecting specific control information from a plurality of pieces of multiplexed control information. The blind decoding is performed by the UE to recover a control channel by combining a plurality of pieces of information in a state where information required to recover the control channel does not exist. That is, in a state where the UE neither knows whether a plurality of pieces of control information received from the BS is control information of the UE nor knows in which location the control information of the UE exists, the UE decodes all pieces of provided control information until the control information of the UE is detected. The UE may use its unique information to determine whether the received control information is control information of the UE. For example, when the BS multiplexes control information of each UE, the BS may transmit a unique identifier of each UE by masking the identifier onto a cyclic redundancy check (CRC). The CRC is a code used in error detection. The UE demasks its unique identifier with the CRC of the received control information, and thereafter can determine whether the received control information is control information of the UE by performing CRC checking.

If the UE does not correctly detect its control information from the plurality of pieces of multiplexed control information, the UE cannot decode user data on a data channel. Therefore, it can be said that rapid and accurate detection on control information has a significant effect on overall system performance. However, it may be difficult to detect the control information by using only simple blind decoding.

Each UE may require different control information and may use a channel encoding scheme using a different code rate. Thus, a size of control information may be different from one UE to another. Consequently, the number of blind decoding attempts may be unexpectedly increased in a control region where control information is transmitted. Battery consumption of the UE increases in proportion to the number of detection attempts.

Accordingly, there is a need for a method of effectively monitoring a control channel, whereby control information is rapidly detected by decreasing the number of detection attempts to reduce battery consumption of a UE.

DISCLOSURE OF INVENTION

Technical Problem

The present invention provides a method and apparatus of effectively monitoring a control channel.

Technical Solution

In an aspect, a method of monitoring a physical downlink control channel (PDCCH) in a wireless communication system is provided. The method includes acquiring a starting location of a search space in a control region of a subframe k, the control region comprising a set of contiguous control channel elements (CCEs) numbered from 0 to $N_{CCE,k}-1$, where $N_{CCE,k}$ is the total number of CCEs in the control region of the subframe k, wherein the search space is defined by a set of PDCCHs at each aggregation level, the each aggregation level indicating an aggregation of contiguous CCEs, wherein the starting location corresponding to a CCE index is defined by the multiple of the aggregation level in the control region, and monitoring the set of PDCCHs from the starting location in the search space at the each aggregation level.

The search space may be a UE specific search space which is monitored by at least one UE in a cell.

The set of PDCCHs may be monitored in the unit of the aggregation level in the search space.

In another aspect, a user equipment includes a Radio Frequency (RF) unit for transmitting and receiving radio signals, and a processor coupled with the RF unit and configured to acquire a starting location of a search space in a control region of a subframe k, the control region comprising a set of contiguous control channel elements (CCEs) numbered from 0 to $N_{CCE,k}-1$, where $N_{CCE,k}$ is the total number of CCEs in the control region of the subframe k, wherein the search space is defined by a set of PDCCHs at each aggregation level, the each aggregation level indicating an aggregation of contiguous CCEs, wherein the starting location corresponding to a CCE index is defined by the multiple of the aggregation level in the control region, and monitor the set of PDCCHs from the starting location in the search space at the each aggregation level.

In still another aspect, a method of monitoring a physical downlink control channel (PDCCH) in a wireless communication system is provided. The method includes acquiring a starting location of a search space in a control region of a subframe, the control region comprising a set of contiguous control channel elements (CCEs), wherein the search space is defined by a set of PDCCHs at each aggregation level, the each aggregation level indicating an aggregation of contiguous CCEs, wherein the starting location is defined according to the aggregation level in the control region, and monitoring the set of PDCCHs from the starting location in the search space at the each aggregation level.

The set of contiguous CCEs in the control region may be numbered from 0 to $N_{CCE}-1$, where $N_{CCE}$ is the total number of CCEs in the control region. The starting location corresponding to a CCE index may be defined by the multiple of the aggregation level in the control region.

The set of contiguous CCEs in the control region may be divided into $$\lfloor N_{CCE}/L \rfloor$$

aggregated CCE units, where $N_{CCE}$ is the total number of CCEs in the control region and L is the aggregation level. The starting location may be one CCE in an aggregated CCE unit selected from the aggregated CCE units.

The starting location may be the first CCE in the aggregated CCE unit selected from the aggregated CCE units.

The aggregated CCE units may be numbered from 0 to $$(\lfloor N_{CCE}/L \rfloor -1)$$

The first CCEs in the aggregated CCE units may be numbered from 0 to $$(\lfloor N_{CCE}/L \rfloor -1)$$

Advantageous Effects

A user equipment (UE) can effectively monitor a downlink control channel. A base station (BS) can effectively multiplex and transmit a plurality of control channels for carrying control information regarding a plurality of UEs. Therefore, the number of detection attempts depending on blind decoding for monitoring the downlink control channel can be reduced. An overhead caused by blind decoding is reduced, and a time for finding the downlink control channel required by the UE is reduced. A battery consumption of the UE is reduced, and overall system performance can be improved.

MODE FOR THE INVENTION

Figure 1:
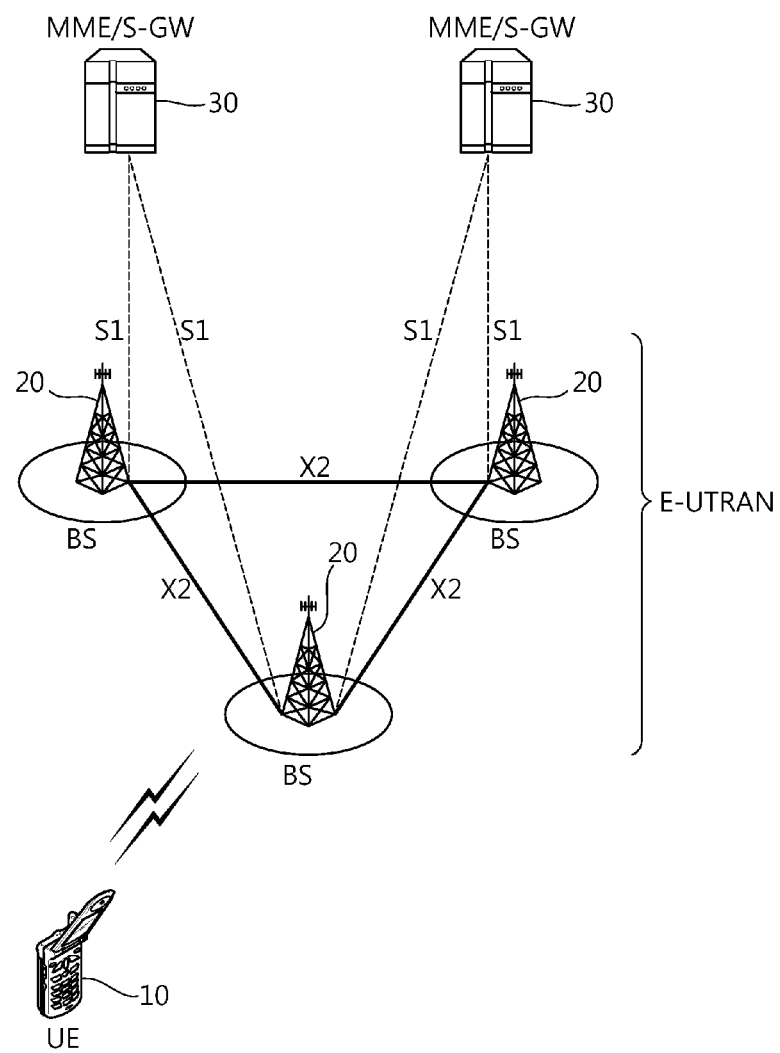
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be also referred to as a long term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. The cell is a region in which the BS 20 provides a communication service. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 2:
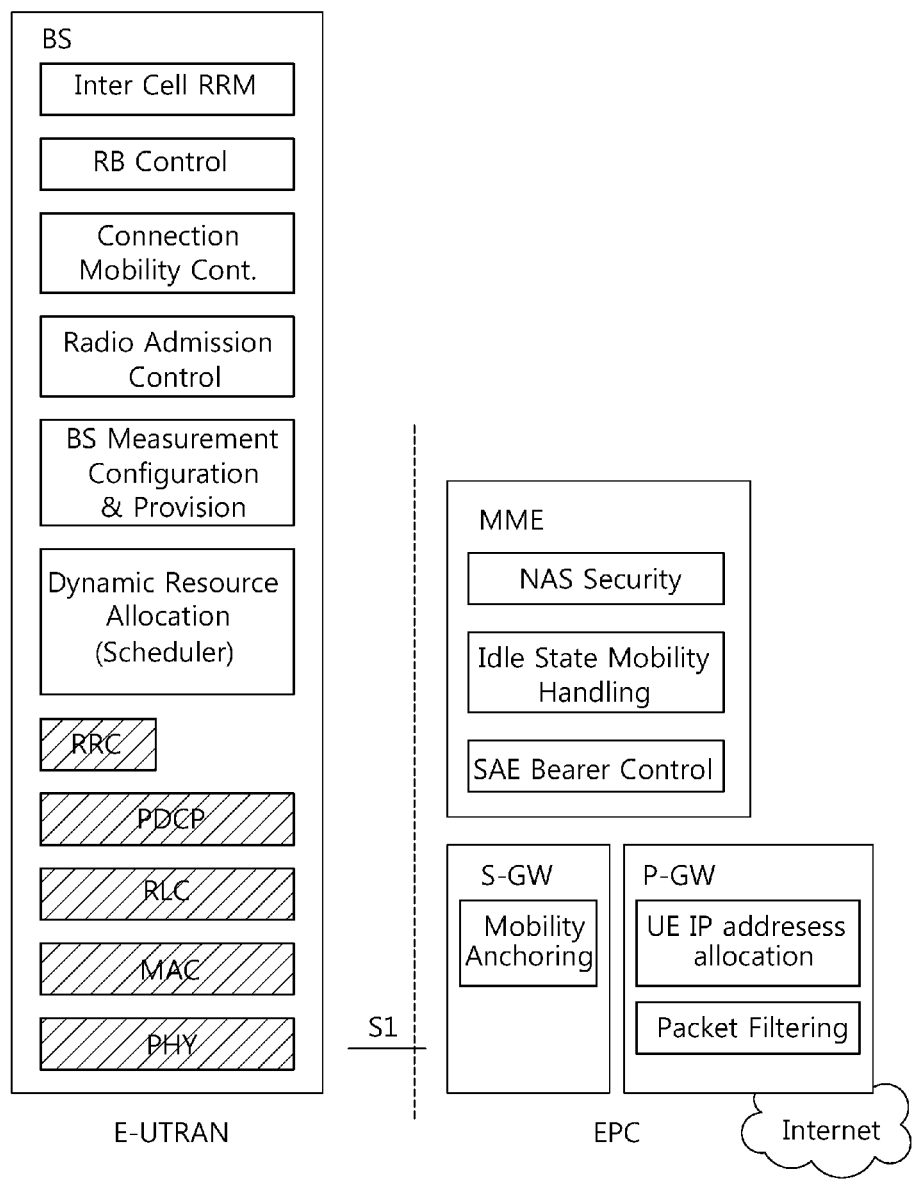
FIG. 2 is a block diagram showing functional split between an evolved universal terrestrial radio access network (E-UTRAN) and an evolved packet core (EPC).

FIG. 2 is a block diagram showing functional split between the E-UTRAN and the EPC. Slashed boxes depict radio protocol layers and white boxes depict the functional entities of the control plane.

Referring to FIG. 2, the BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) non-access stratum (NAS) signaling; (2) NAS signaling security; (3) idle mode UE reachability; (4) tracking area list management; (5) roaming; and (6) authentication.

The S-GW performs the following functions: (1) mobility anchoring; and (2) lawful interception. A PDN gateway (P-GW) performs the following functions: (1) UE IP allocation; and (2) packet filtering.

Figure 3:
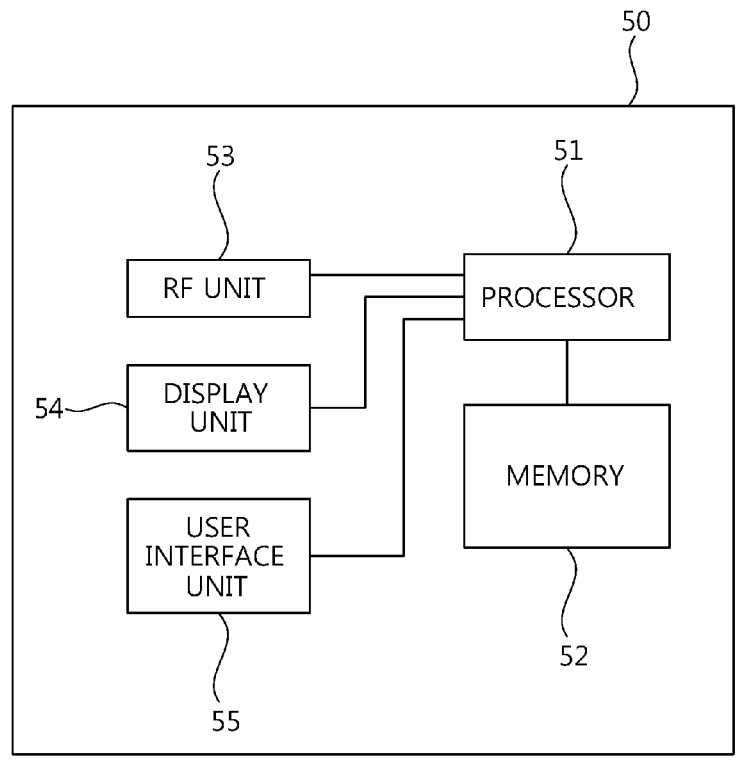
FIG. 3 is a block diagram showing a user equipment for implementing monitoring of control channel.

FIG. 3 is a block diagram showing an user equipment for implementing monitoring of control channel. A UE 50 includes a processor 51, a memory 52, a radio frequency (RF) unit 53, a display unit 54, and a user interface unit 55. Layers of the radio interface protocol are implemented in the processor 51. The function of each layer can be implemented in the processor 51. The processor 51 having a physical layer may implement monitoring of a control channel disclosed herein. The memory 52 is coupled to the processor 51 and stores various parameters for operating the processor 51. The display unit 54 displays a variety of information of the apparatus 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 4:
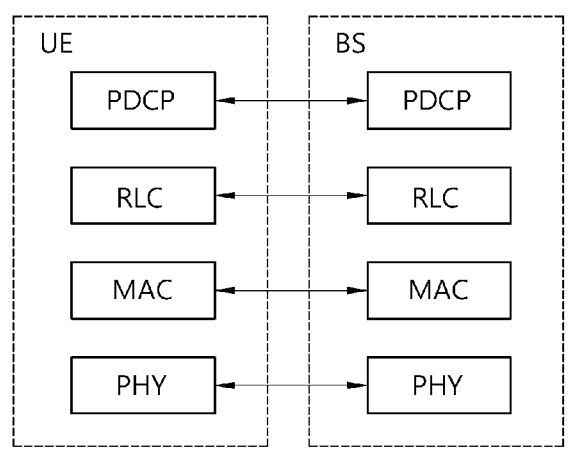
FIG. 4 is a diagram showing a radio protocol architecture for a user plane.
Figure 5:
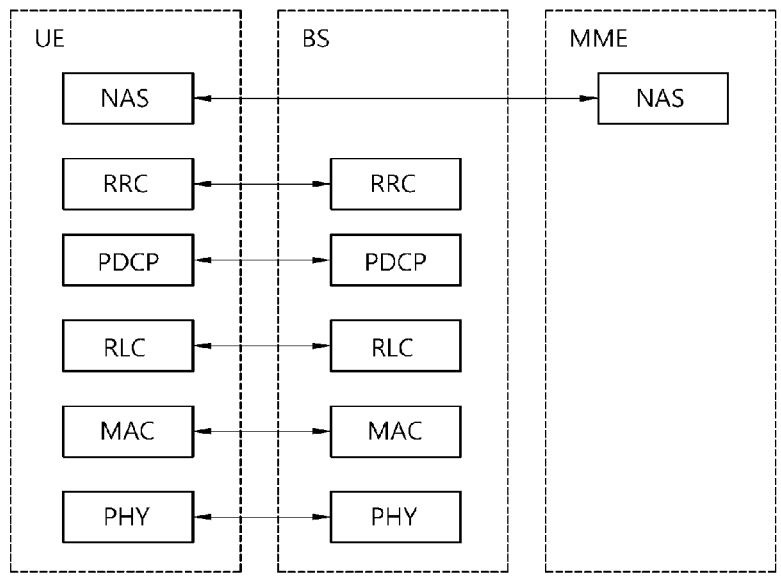
FIG. 5 is a diagram showing a radio protocol architecture for a control plane.

FIG. 4 is a diagram showing a radio protocol architecture for the user plane. FIG. 5 is a diagram showing a radio protocol architecture for the control plane. They illustrate the architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data is transferred through the physical channel.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of the RLC protocol data unit (PDU) fails.

A packet data convergence protocol (PDCP) layer belongs to the second layer and performs a header compression function for reducing an IP packet header size.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 6:
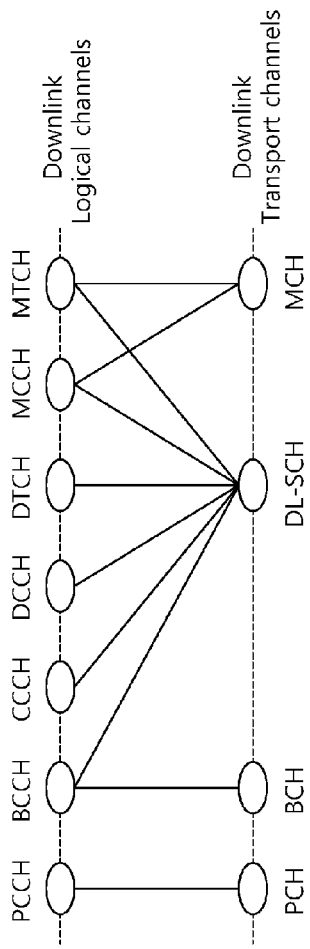
FIG. 6 shows mapping between downlink logical channels and downlink transport channels.

FIG. 6 shows mapping between downlink logical channels and downlink transport channels. This may be found in section 6.1.3.2 of the 3GPP TS 36.300 V8.3.0 (2007-12) Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Referring to FIG. 6, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH).

A type of each logical channel is defined according to a type of information to be transmitted. A logical channel is classified into two groups, i.e., a control channel and a traffic channel.

The control channel is used for the transfer of control plane information. The BCCH is a downlink channel for broadcasting system control information. The PCCH is a downlink channel for transmitting paging information and is used when a network does not know the location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information. The MCCH is used by UEs that receive an MBMS. The DCCH is a point-to-point unidirectional channel for transmitting dedicated control information between the UE and the network, and is used by UEs having an RRC connection.

The traffic channel is used for the transfer of user plane information. The DTCH is a point-to-point channel used for the transfer of user information. The DTCH can exist in both uplink and downlink. The MTCH is a point-to-multipoint downlink channel for transmitting traffic data and is used by the UEs that receive the MBMS.

The transport channel is classified according to a type and characteristic of data transmission through a radio interface. The BCH is broadcast in the entire coverage area of the cell and has a fixed, pre-defined transport format. The DL-SCH is characterized by support for hybrid automatic repeat request (HARQ), support for dynamic link adaptation by varying modulation, coding, and transmit power, possibility to be broadcast in the entire cell, and possibility to use beamforming, support for both dynamic and semi-static resource allocation, support for UE discontinuous reception (DRX) to enable UE power saving, and support for MBMS transmission. The PCH is characterized by support for DRX to enable UE power saving and support for broadcast in the entire coverage area of the cell. The MCH is characterized by support for broadcast in the entire coverage area of the cell and support for an MBMS single frequency network (MBSFN).

Figure 7:
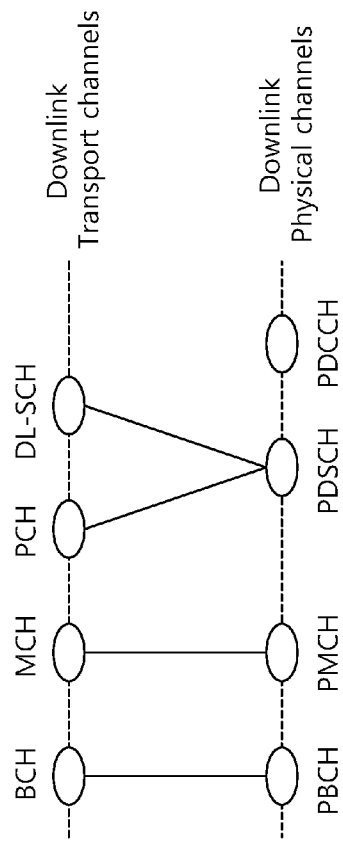
FIG. 7 shows mapping between downlink transport channels and downlink physical channels.

FIG. 7 shows mapping between downlink transport channels and downlink physical channels. This may be found in section 5.3.1 of the 3GPP TS 36.300 V8.3.0 (2007-12).

Referring to FIG. 7, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH.

There are several downlink physical control channels used in a PHY layer. A physical downlink control channel (PDCCH) informs a UE of resource allocation of the PCH and DL-SCH, and also informs the UE of HARQ information related to the DL-SCH. The PDCCH may carry an uplink scheduling grant which informs the UE of resource allocation for uplink transmission. A physical control format indicator channel (PCFICH) informs the UE of the number of orthogonal frequency division multiplexing (OFDM) symbols used for the transfer of PDCCHs in a subframe. The PCFICH is transmitted in every subframe. A physical hybrid ARQ indicator channel (PHICH) carries HARQ acknowledgement (ACK)/negative-acknowledgement (NACK) signals in response to uplink transmission.

Figure 8:
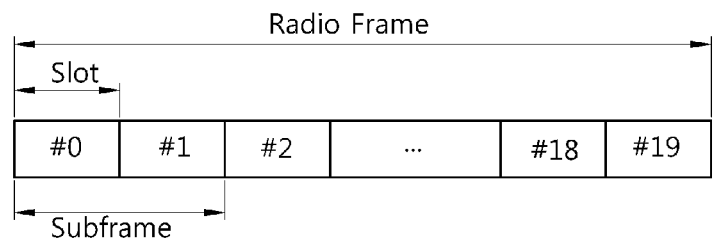
FIG. 8 shows a structure of a radio frame.

FIG. 8 shows a structure of a radio frame.

Referring to FIG. 8, the radio frame includes 10 subframes. One subframe includes two slots. A time for transmitting one subframe is defined as a transmission time interval (TTI). For example, one subframe may have a length of 1 milliseconds (ms), and one slot may have a length of 0.5 ms.

The radio frame of FIG. 8 is shown for exemplary purposes only. Thus, the number of subframes included in the radio frame or the number of slots included in the subframe or the number of OFDM symbols included in the slot may change variously.

Figure 9:
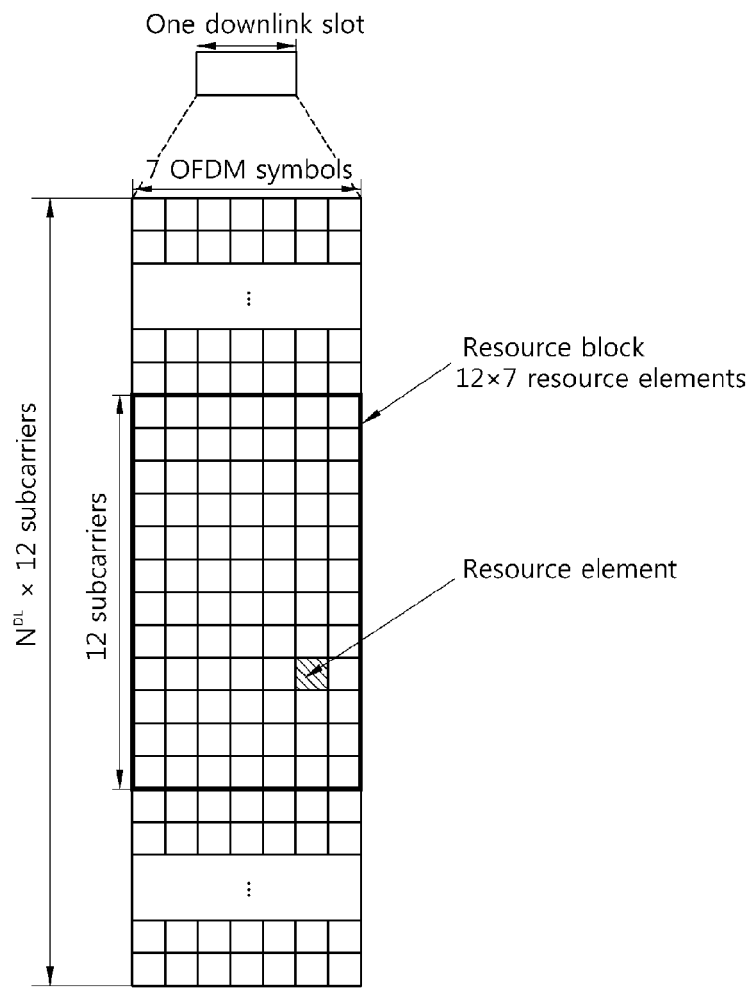
FIG. 9 shows an example of a resource grid for one downlink slot.

FIG. 9 shows an example of a resource grid for one downlink slot.

Referring to FIG. 9, the downlink slot includes a plurality of OFDM symbols in a time domain. Although it is described herein that one downlink slot includes 7 OFDM symbols in the time domain and one resource block includes 12 subcarriers in a frequency domain, this is for exemplary purposes only, and thus the present invention is not limited thereto.

Elements on the resource grid are referred to as resource elements (RE). One resource block includes 12×7 resource elements. The number $N^{DL}$ of resource blocks included in the downlink slot depends on a downlink transmission bandwidth determined in a cell.

Figure 10:
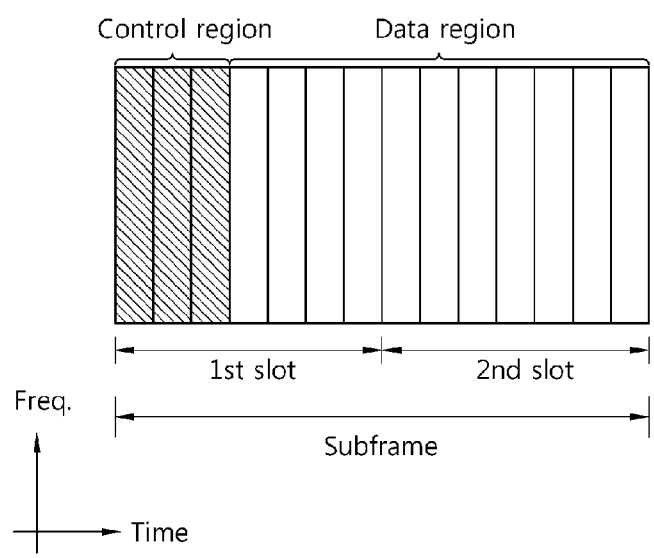
FIG. 10 shows a structure of a subframe.

FIG. 10 shows a structure of a subframe. A subframe includes two consecutive slots. A maximum of three OFDM symbols located in a front portion of a first slot within the subframe correspond to a control region to be assigned with one or more PDCCHs. The remaining OFDM symbols correspond to a data region to be assigned with one or more PDSCHs. In addition to the PDCCH, control channels such as a PCFICH, a PHICH, etc., can be assigned to the control region. The UE can read data information transmitted through the PDSCH by decoding control information transmitted through the PDCCH. Although the control region includes three OFDM symbols herein, this is for exemplary purposes only. The number of OFDM symbols included in the control region of the subframe can be known by using the PCFICH.

The control region consists of a plurality of control channel elements (CCEs), i.e., a logical CCE stream. Hereinafter, the CCE stream denotes a set of all CCEs constituting the control region in one subframe. The CCE corresponds to a plurality of resource element groups. For example, the CCE may correspond to 9 resource element groups. The resource element group is used to define mapping of a control channel onto a resource element. For example, one resource element group may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. The CCE aggregation level is a CCE unit for searching for the PDCCH. A size of the CCE aggregation level is defined by the number of contiguous CCEs. For example, the CCE aggregation level may be an element of {1, 2, 4, 8}.

Table 1 below shows examples of the PDCCH format and the number of available PDCCH bits according to the CCE aggregation level.

TABLE 1

| PDCCH format | CCE aggregation level | Number of resource element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Control information transmitted through the PDCCH is referred to as downlink control information (DCI). The DCI transmits uplink or downlink scheduling information, an uplink power control command, control information for paging, control information for indicating a random access channel (RACH) response, etc. Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1C for significantly compact scheduling of a downlink shared channel (DL-SCH), a format 2 for scheduling of the PDSCH in a closed-loop spatial multiplexing mode, a format 2A for scheduling of the PDSCH in an open-loop spatial multiplexing mode, and formats 3 and 3A for transmission of a transmission power control (TPC) command for an uplink channel.

Figure 11:
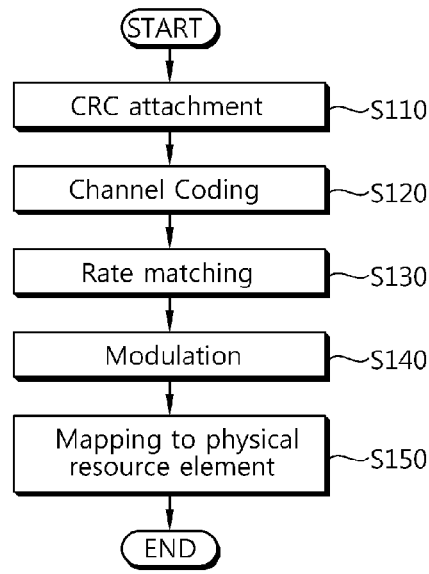
FIG. 11 is a flowchart showing a physical downlink control channel (PDCCH) configuration.

FIG. 11 is a flowchart showing a PDCCH configuration.

Referring to FIG. 11, in step S110, a BS appends a cyclic redundancy check (CRC) to a DCI to be sent to a UE so as to detect an error. An identifier (i.e., a radio network temporary identifier (RNTI)) is masked on the CRC according to a usage or an owner of the PDCCH. If the PDCCH is for a specific UE, a unique identifier (e.g., cell-RNTI (C-RNTI)) of the UE can be masked on the CRC. If the PDCCH is for a paging message transmitted through a PCH, a paging identifier (e.g., paging-RNTI (P-RNTI)) can be masked on the CRC. If the PDCCH is for system information transmitted through a DL-SCH, a system information identifier (e.g., system information-RNTI (SI-RNTI)) can be masked on the CRC. If the PDCCH is for indicating a random access response that is a response for transmission of a random access preamble of the UE, a random access-RNTI (RA- RNTI) can be masked on the CRC. Table 2 below shows an example of identifiers masked on the PDCCH.

TABLE 2

| Type | Identifier | Description |
| --- | --- | --- |
| UE-specific | C-RNTI | used for a unique UE identification |
| Common | P-RNTI | used for paging message |
|  | SI-RNTI | used for system information |
|  | RA-RNTI | used for random access response |

When the C-RNTI is used, the PDCCH carries control information for a corresponding specific UE. When other RNTIs are used, the PDCCH carries common control information received by all UEs in a cell.

In step S120, channel coding is performed on the CRC-appended control information to generate coded data. In step S130, rate matching is performed according to a CCE aggregation level assigned to the PDCCH format. In step S140, the coded data is modulated to generate modulation symbols. The number of modulation symbols constituting one PDCCH may differ according to the CCE aggregation level (i.e., one of 1, 2, 4, and 8). In step S150, the modulation symbols are mapped to physical resource elements (REs) (i.e., CCE to RE mapping).

A plurality of PDCCHs can be transmitted in one subframe. The UE obtains a logical CCE stream by demapping one or more physical resource elements constituting a control region of one subframe (i.e., CCE to RE demapping). The UE monitors the PDCCHs in the CCE stream. Monitoring is an operation in which the UE attempts to decode each PDCCH according to a DCI format to be monitored. The BS does not provide information indicating where a PDCCH corresponding to the UE is located in the CCE stream. The UE finds its PDCCH by monitoring a set of PDCCH candidates in the CCE stream. This is called blind detection. For example, if a CRC error is not detected as a result of CRC checking after demasking a C-RNTI of the UE with a corresponding PDCCH, it is regarded that the PDCCH of the UE is detected by the UE.

In an active mode, the UE monitors the set of PDCCH candidates in every subframe to receive data transmitted to the UE. In a DRX mode, the UE wakes up in a monitoring duration of each DRX period and monitors the set of PDCCH candidates in a subframe corresponding to the monitoring duration. The subframe at which the PDCCH is monitored is called a non-DRX subframe.

As such, to receive the PDCCH transmitted to the UE, the UE has to perform blind decoding on all CCEs of a non-DRX subframe. Since the UE does not know a format of the transmitted PDCCH, the UE has to decode all PDCCHs at a possible CCE aggregation level until blind decoding on the PDCCH is successfully achieved in every non-DRX subframe.

Figure 12:
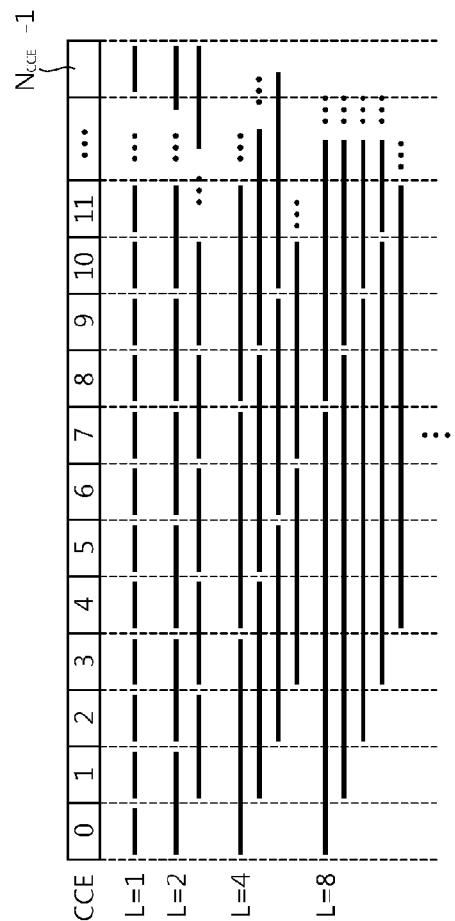
FIG. 12 shows an example of control channel monitoring.

FIG. 12 shows an example of control channel monitoring.

Referring to FIG. 12, the total number of CCEs in a corresponding subframe is $N_{CCE}$. There are four types of a CCE aggregation level L, i.e., {1, 2, 4, 8}. If the CCE aggregation level is '1', a UE can perform blind decoding at all CCE indices. If the CCE aggregation level is '2', '4', or '8', the UE also can perform blind decoding at all CCE indices. That is, the UE can perform blind decoding at all CCE indices for each CCE aggregation level.

Further, the UE attempts blind decoding for all of four RNTIs (i.e., C-RNTI, P-RNTI, SI-RNTI, and RA-RNTI). Furthermore, the UE attempts blind decoding for all DCI formats to be monitored.

As such, if the UE attempts blind decoding for all possible RNTIs, for all DCI formats to be monitored, and for all CCE aggregation levels, a significantly large number of detection attempts is required, which may lead to increase in power consumption of the UE due to PDCCH monitoring. Therefore, there is a need for a method of effectively monitoring a control channel, whereby power consumption of the UE can be reduced by decreasing the number of detection attempts for blind decoding.

To reduce the number of detection attempts depending on blind decoding, instead that a PDCCH carrying specific control information is arbitrarily allocated on a CCE stream, the PDCCH can be limitedly allocated on the CCE stream at a specific position, a specific starting location, or a specific range. In this case, the UE can search for the PDCCH by simply performing blind decoding only at the specific position, the specific starting location, or the specific range. Therefore, the number of detection attempts for blind coding can be reduced. Hereinafter, the specific range on the CCE stream is defined as a search space.

The search space is a space for searching for a PDCCH on a logical CCE stream. A set of PDCCH candidates to be monitored is defined according to the search space. The search space is a set of continuous CCEs from a specific starting location within the CCE stream according to the CCE aggregation level. The search space is defined according to each CCE aggregation level. In the search space, the PDCCH candidates are independently located for each CCE aggregation level. That is, the specific starting location where the PDCCH can be located may differ according to each CCE aggregation level.

The control information carried on the PDCCH can be classified into common control information received by all UEs in a cell and UE-specific control information received by a specific UE in the cell. The BS multiplexes and transmits the common control information and the UE-specific control information regarding the plurality of UEs. Therefore, the search space can be divided into a common search space for the common control information and a UE-specific search space for the UE-specific control information.

The common search space is allocated with a PDCCH carrying the common control information. The number of detection attempts can be reduced when the UE attempts blind decoding on a set of PDCCH candidates carrying the common control information only within the common search space. Examples of the common control information include control information for paging message, control information for system information, control information for system information modification, control information for random access response, etc. In the common control information, a CRC may be masked with an RNTI for each common control information. For example, the CRC may be masked with P-RNTI, SI-RNTI, RA-RNTI, etc., according to each common control information.

The common search space may be different from one subframe to another, or may be the same in every subframe. A starting location of the common search space is the same for all UEs in a cell. That is, the starting location of the common search space is fixed to all UEs in the cell. The starting location of the common search space may be the same for all cells. Alternatively, to randomize inter-cell interference, a starting location of a different common search space may be determined for each cell. The starting location of the common search space may be predetermined between the BS and the UE, or may be reported by the BS to the UE through RRC signaling or system information.

The UE-specific search space is allocated with a PDCCH carrying the UE-specific control information. The number of detection attempts can be reduced when the UE attempts blind decoding on a set of PDCCH candidates carrying the UE-specific control information only within the UE-specific search space. For this, the UE finds a starting location of the UE-specific search space and then attempts blind decoding on the set of PDCCH candidates carrying the UE-specific control information from the starting location. The starting location of the UE-specific search space may differ for each UE, each subframe, and each CCE aggregation level.

Examples of the UE-specific control information include uplink scheduling allocation information and downlink scheduling allocation information on a specific UE. The UE-specific control information allocated to the UE-specific search space may be limited to UE-specific control information having a relatively long information payload length. The payload length changes semi-statically in uplink scheduling allocation or downlink scheduling allocation for single input multiple output (SIMO)/multiple input multiple output (MIMO) operations. Therefore, in the UE-specific search space in a subframe, blind decoding is performed in accordance with a payload format corresponding to a transport mode used in the subframe. In the UE-specific control information, the CRC can be masked with the C-RNTI.

To find the starting location of the UE-specific search space, a hashing function can be implemented in the UE. The hashing function is a function for specifying the starting location of the UE-specific search space. The hashing function can use inputs such as a UE identifier (ID), a CCE aggregation level, a subframe number, the number of available CCEs of a corresponding subframe, a specific constant, etc. Hereinafter, the number of available CCEs of the corresponding subframe denotes the number of CCEs constituting the logical CCE stream. The hashing function may output the starting location of the UE-specific search space as a CCE index number on a set of CCEs.

As such, the common search space is a search space monitored by all UEs in a cell, and the UE-specific search space is a search space monitored by a specific UE. The UE monitors both the common search space and the UE-specific search space. The common search space may overlap with the UE-specific search space.

The starting location of the UE-specific search space can be output by the hashing function, which will be described hereinafter.

It is assumed that, for each CCE aggregation level, all CCEs on a CCE stream can be the starting location of the UE-specific search space. For example, if the total number of CCEs constituting a logical CCE stream in a k-th subframe is $N_{CCE,k}$, the number of starting locations of UE-specific search space available on the CCE stream of the k-th subframe is $N_{CCE,k}$.

As such, when all CCEs on the CCE stream can be the starting location of the UE-specific search space, the number of available UE-specific search space becomes significantly large. Therefore, there is a high possibility that a search space specified for one UE-specific search space overlaps with a search space specified for another UE. This does not conform to the purpose of reducing the number of detection attempts depending on blind decoding by limiting the UE-specific search space on the CCE stream. In addition, an overhead is caused since all available UE-specific search spaces have to be considered when the BS schedules the PDCCH on the CCE stream for each of a plurality of UEs.

Accordingly, there is a need to restrict a CCE that can be the starting location of the UE-specific search space on the CCE stream for each CCE aggregation level.

Figure 13:
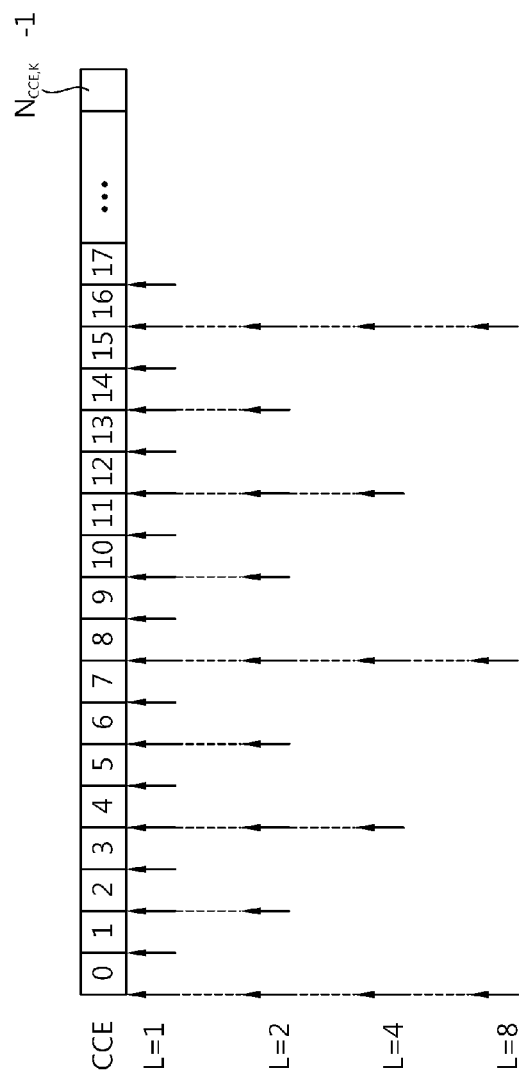
FIG. 13 shows a control channel element (CCE) that can be a starting location of a UE-specific search space.

FIG. 13 shows a CCE that can be the starting location of the UE-specific search space.

Referring to FIG. 13, the total number of CCEs constituting a logical CCE stream in a k-th subframe is $N_{CCE,k}$. The CCEs are indexed from 0 to '$N_{CCE,k}-1$'. The starting location (see the arrow mark in FIG. 13) of the UE-specific search space satisfies Equation 1 as shown:

MathFigure 1

$$i \bmod L = O \qquad \text{[Math.1]}$$

where, i denotes a CCE index, and L denotes a CCE aggregation level.

If the CCE aggregation level is L, the number of available UE-specific search spaces on the CCE stream of the k-th subframe is $$\lfloor N_{CCE,k}/L \rfloor$$

where $$\lfloor x \rfloor$$

is a floor function which gives a largest integer less than or equal to x. It can be seen that the number of available UE-specific search spaces is reduced. Therefore, a possibility that the search space specified to one UE overlaps with the search space specified to another UE can be reduced. In addition, an overhead can be reduced when a BS schedules a PDCCH on the CCE stream for each of a plurality of UEs.

If the CCE aggregation level is L, it is effective to limit the CCE that can be the starting location of the UE-specific search space on the CCE stream to a multiple of the CCE aggregation level L. A set of CCE indices that can be the starting location $Z_k^{(L)}$ of the UE-specific search space in the k-th subframe can be expressed by Equation 2 below.

MathFigure 2

$$Z_k^{(L)} \in \left\{ 0, L, 2L, 3L \ldots, L \cdot \left( \left\lfloor \frac{N_{CCE,k}}{L} \right\rfloor - 1 \right) \right\} \qquad \text{[Math. 2]}$$

Table 3 below shows an example of a search space. In Table 3, a size L of CCE aggregation level and the number $M^{(L)}$ of PDCCH candidates are for exemplary purposes only, and thus the present invention is not limited thereto.

TABLE 3

| | Search space | | |
|---|---|---|---|
| Type | Aggregation LevelL [CCEs] | Size of Search Space[in CCEs] | Number of PDCCH candidates $M^{(L)}$-D |
| UE-specific | 1 | 6 | 6 |
| | 2 | 12 | 6 |
| | 4 | 8 | 2 |
| | 8 | 16 | 2 |
| Commmon | 4 | 16 | 4 |
| | 8 | 16 | 2 |

The UE-specific search space supports a CCE aggregation level L, where L∈{1, 2, 4, 8}. The common search space supports the CCE aggregation level L, where L∈{4, 8}. The size of search space is determined according to the size of CCE aggregation level and the number of PDCCH candidates. That is, the size of search space is a multiple of the size of CCE aggregation level or a multiple of the number of PDCCH candidates.

If the total number of CCEs in the k-th subframe is $N_{CCE,k}$, a search space $S_k^{(L)}$ in the CCE aggregation level L, where L∈{1, 2, 4, 8}, can be expressed by Equation 3 as shown:

MathFigure 3

$$(Z_k^{(L)}+i) \bmod N_{CCE,k} \quad \text{[Math.3]}$$

where $Z_k^{(L)}$ denotes a starting location of search space, and i=0, 1, . . . , $M^{(L)}$·L−1, $M^{(L)}$ denote the number of PDCCH candidates in a given search space. The starting location is a point where a first PDCCH candidate is located in the search space. The UE detects the PDCCH allocated to the UE by decoding PDCCH candidates in the unit of the CCE aggregation level from the starting location in the search space. A modulo operation is performed for cyclic search on the CCE stream.

The starting location of the UE-specific search space may differ for each CCE aggregation level or each UE. Equation 4 below shows an example of a hashing function for obtaining the starting location $Z_k^{(L)}$ of the UE-specific search space.

MathFigure 4

$$Z_k^{(L)} = L \cdot (Y_k \bmod \lfloor N_{CCE,k}/L \rfloor),$$

$$Y_k = (A \cdot Y_{k-1}) \bmod D \quad \text{[Math.4]}$$

In Equation 4, $Y_{-1} = n_{RNTI} \neq 0$, A=39827, and D=65537. It can be seen that a CCE index that can be the starting location $Z_k^{(L)}$ of the UE-specific search space is a multiple of the CCE aggregation level L.

In the common search space, the starting location of the common search space is the same for all UEs in a cell. For example, the starting location can be fixed to $Z_k^{(L)}=0$ for two CCE aggregation levels, i.e., L=4 and L=8, in the k-th subframe.

Hereinafter, a method of indexing CCEs will be described when a CCE that can be a starting location of a UE-specific search space on a CCE stream is limited to be a multiple of a CCE aggregation level L.

Figure 14:
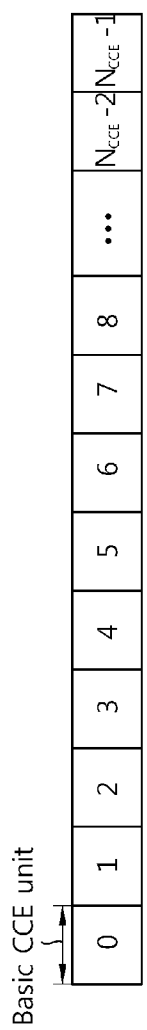
FIG. 14 shows an example of a method of indexing CCEs on a CCE stream.

FIG. 14 shows an example of a method of indexing CCEs on a CCE stream.

Referring to FIG. 14, the total number of CCEs constituting the CCE stream is $N_{CCE}$. The CCEs are sequentially indexed from 0 to '$N_{CCE}-1$'. Irrespective of a CCE aggregation level, the CCEs are indexed in a basic CCE unit.

Figure 15:
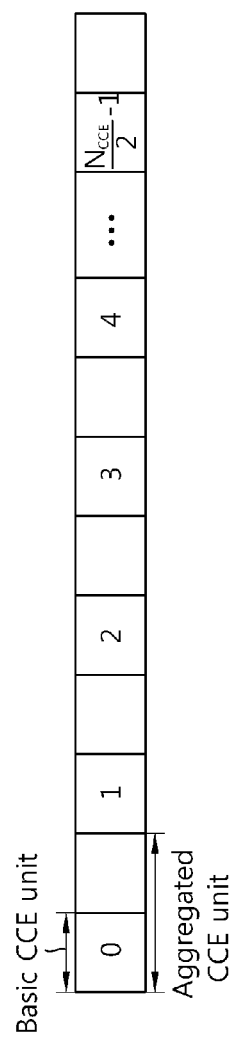
FIG. 15 shows an example of a method of indexing CCEs when a CCE aggregation level is 2.

FIG. 15 shows an example of a method of indexing CCEs when a CCE aggregation level is 2.

Referring to FIG. 15, the total number of CCEs constituting a CCE stream is $N_{CCE}$. A first CCE of each aggregated CCE unit is indexed. Thus, the aggregated CCE units are sequentially indexed from 0 to '$N_{CCE}/2-1$'.

Figure 16:
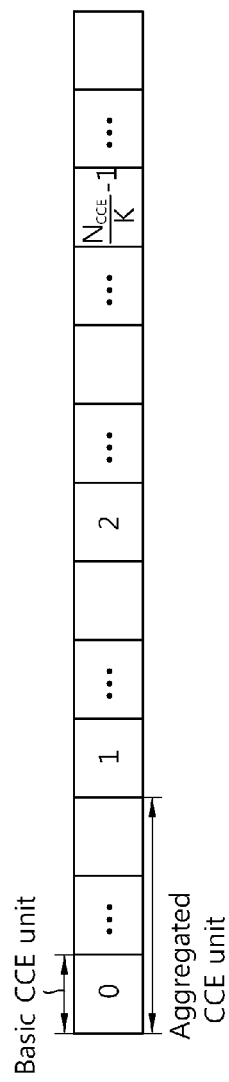
FIG. 16 shows an example of a method of indexing CCEs when a CCE aggregation level is K.

FIG. 16 shows an example of a method of indexing CCEs when a CCE aggregation level is K.

Referring to FIG. 16, the total number of CCEs constituting a CCE stream is $N_{CCE}$. A first CCE of each aggregated CCE unit is indexed. Thus, the aggregated CCE units are sequentially indexed from 0 to '$N_{CCE}/K-1$'.

As shown in FIGS. 15 and 16, when a first CCE of each aggregated CCE unit is indexed according to the CCE aggregation level, the hashing function can be expressed by:

MathFigure 5

$$\text{Start} = (K \cdot x + L) \bmod (\lfloor N_{CCE}/L \rfloor)$$

$$x = UEID \cdot 16 + SFN \quad \text{[Math.5]}$$

where 'Start' denotes a starting location of a UE-specific search space, which is an output of the hashing function. 'UEID' denotes a UE ID. 'SFN' denotes a subframe number in a radio frame. $N_{CCE}$ denotes the total number of CCEs constituting the CCE stream. L denotes the CCE aggregation level.

In addition, when a first CCE of each aggregated CCE unit is indexed according to the CCE aggregation level, the hashing function can also be expressed by:

MathFigure 6

$$Z_k^{(L)} = Y_k \bmod \lfloor N_{CCE,k}/L \rfloor,$$

$$Y_k = (A \cdot Y_{k-1}) \bmod D \quad \text{[Math.6]}$$

where $Y_{-1} = n_{RNTI} \neq 0$, A=39827, and D=65537.

Similarly to FIG. 14, if every CCE is indexed irrespective of the CCE aggregation level, the hashing function can be expressed by Equation 7 below.

MathFigure 7

$$\text{Start} = \{(K \cdot x + L) \bmod (\lfloor N_{CCE}/L \rfloor)\} \cdot L$$

$$x = UEID \cdot 16 + SFN \quad \text{[Math.7]}$$

In comparison with Equation 5, the CCE aggregation level L is multiplied in Equation 7.

In addition, if every CCE is indexed irrespective of the CCE aggregation level, the hashing function can also be expressed by:

MathFigure 8

$$Z_k^{(L)} = L \cdot (Y_k \bmod \lfloor N_{CCE,k}/L \rfloor),$$

$$Y_k = (A \cdot Y_{k-1}) \bmod D \quad \text{[Math.8]}$$

where $Y_{-1} = n_{RNTI} \neq 0$, A=39827, and D=65537. In comparison with Equation 6, the CCE aggregation level L is multiplied in Equation 8.

According to the method described above, the UE can effectively monitors the PDCCH. In addition, the BS can effectively multiplex and transmit a plurality of PDCCHs carrying control information regarding a plurality of UEs. Therefore, the number of detection attempts depending on blind decoding for monitoring the PDCCH can be reduced. An overhead caused by blind decoding is reduced, and a time for finding the downlink control channel required by the UE is reduced. A battery consumption of the UE is reduced, and overall system performance can be improved.

The present invention can be implemented with hardware, software, or combination thereof. Regarding hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. Regarding software implementation, the present invention can be implemented with a module for performing the aforementioned functions. Software is storable in a memory unit and executed by a processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for monitoring a control channel in a wireless communication system, the method comprising:
   receiving, by a user equipment (UE), information about a cell identifier identifying a serving cell on which a physical downlink control channel (PDCCH) for the UE is to be monitored;
   receiving, by the UE, information about a cell-radio network temporary identifier (C-RNTI) identifying the UE by the serving cell;
   monitoring, by the UE, the PDCCH in a UE-specific search space of a subframe based on a starting point of the UE-specific search space, the starting point of the UE-specific search space being determined based on at least one of the C-RNTI and the cell identifier; and
   receiving, by the UE, the PDCCH having a Cyclic Redundancy Check (CRC) destined to the UE that is masked with the C-RNTI but not the cell identifier,
   wherein the PDCCH is received by determining the starting point of the UE-specific search space based on the C-RNTI if monitoring a common search space which is monitored by all UEs is switched on, and the PDCCH is received by determining the starting point of the UE-specific search space based on both the cell identifier and the C-RNTI if monitoring the common search space is switched off.

2. The method of claim 1, wherein the subframe includes a plurality of orthogonal frequency division multiplexing (OFDM) symbols.

3. The method of claim 2, wherein the UE-specific search space is defined in at least one of the OFDM symbols.

4. The method of claim 3, further comprising:
   receiving information about a number of the at least one of the OFDM symbols in which the UE-specific search space is defined.

5. A user equipment (UE) for monitoring a control channel in a wireless communication system, the UE comprising:
   a radio frequency (RF) unit configured to receive and transmit radio signals; and
   a processor operatively coupled with the RF unit and configured to:
      control the RF unit to receive information about a cell identifying a serving cell on which a physical downlink control channel (PDCCH) for the UE is to be monitored;
      control the RF unit to receive information about a cell-radio network temporary identifier (C-RNTI) identifying the UE;
      monitor, by the UE, the PDCCH in a UE-specific search space of a subframe a starting point of the UE-specific search space, the starting point of the UE-specific search space being determined based on at least one of the C-RNTI and the cell identifier; and
      control the RF unit to receive the PDCCH having a Cyclic Redundancy Check (CRC) destined to the UE that is masked with the C-RNTI but not the cell identifier,
   wherein the PDCCH is received by determining the starting point of the UE-specific search space based on the C-RNTI if monitoring a common search space which is monitored by all UEs is switched on, and the PDCCH is received by determining the starting point of the UE-specific search space based on both the cell identifier and the C-RNTI if monitoring the common search space is switched off.

6. The UE of claim 5, wherein the subframe includes a plurality of orthogonal frequency division multiplexing (OFDM) symbols.

7. The UE of claim 6, wherein the UE-specific search space is defined in at least one of the OFDM symbols.

8. The UE of claim 7, wherein the processor is further configured to control the RF unit to receive information about a number of the at least one of the OFDM symbols in which the UE-specific search space is defined.

* * * * *